Patented Sept. 28, 1948

2,450,389

UNITED STATES PATENT OFFICE 2,450,389

MANUFACTURE OF CROTONIC ACID

Karl Heinrich Walter Tuerck, Banstead, England, assignor to The Distillers Company Limited, Edinburgh, Scotland, a British company No Drawing. Application December 9, 1944, Serial No. 567,526. In Great Britain December 2, 1943

5 Claims. (Cl. 260—530)

It is known that in the manufacture of crotonic acid by the oxidation of crotonaldehyde with molecular oxygen, a great amount of crotonaldehyde is converted to undesired by-products (see Wiener Monatschefte 1929, volume 53–54, pages 119–126). Among these undesired by-products are higher-boiling substances which make the separation of crotonic acid from the reaction mixture costly and difficult, if not impossible.

I have now found that when bringing crotonaldehyde into intimate contact with oxygen the proportion of the by-products in the reaction mixture increases with the amount of crotonaldehyde converted and that this increase becomes considerable if more than 60% of the crotonaldehyde is converted. Thus, for example, when starting from a mixture containing 12 mols. of crotonaldehyde and oxidising at 25° C. with oxygen, the loss of crotonaldehyde, i. e. that which is not converted to crotonic acid, amounts to 0.8 mol. after 4 mols. have been oxidised, to 1 mol. after 6 mols. have been oxidised and to 4.5 mols. after the oxidation has been carried to completion. When, under analogous conditions, air is used instead of oxygen, the loss of crotonaldehyde amounts to 4 mols. when as little as 10 mols. of crotonaldehyde have been oxidised.

I have further found that the amount of high-boiling impurities is considerably increased if the oxidation is carried out under conditions which permit only a slow oxidation—that is, if diluted oxygen or air, or oxygen in the presence of gaseous reaction products such as carbon dioxide, is used as the oxidising agent.

It is therefore an object of my invention to provide a process which permits of the production of crotonic acid by the oxidation of crotonaldehyde with a high efficiency and without the formation of appreciable amounts of high-boiling by-products.

According to the present invention a continuous process for the manufacture of crotonic acid by the oxidation of crotonaldehyde by means of molecular oxygen is characterised in that the concentration of crotonaldehyde in the reaction mixture is maintained above 50% by weight thereof and molecular oxygen is continuously introduced into said reaction mixture in intimate admixture therewith so that any gaseous reaction products are continuously or periodically removed from the reaction mixture.

The reaction may be carried out in the presence of suitable oxidation catalysts, but it is, however, preferred to oxidise in the absence of such catalysts.

When working according to the method of this invention, efficiencies higher than 80% and an almost uncoloured reaction mixture are obtained. The temperature at which I prefer to carry out the oxidation is 25–35° C. I have further found that the per-compounds which are formed during the oxidation of crotonaldehyde with air or oxygen are comparatively stable and, in contrast to what occurs during the oxidation of acetaldehyde, do not noticeably decompose during the course of the reaction when working batchwise. In the process according to my invention, however, the amount of peroxides in the reaction product is comparatively low and within the limits which allow safe storage and working up of the reaction mixture.

Recovery of crotonic acid from the reaction mixture may be effected either by crystallisation or by distillation at normal or reduced pressure. A simple way, however, is to steam distil the crotonic acid after crotonaldehyde has been removed from the reaction mixture.

I have found that when oxidising crotonaldehyde according to the process of my invention the steam distillate yields a crotonic acid which is sufficiently pure for commercial requirements so that no further purification is necessary.

Instead of crystallising the crotonic acid from the aqueous steam distillate it is, therefore, possible to subject the vapours leaving the steam distillation to a fractional condensation, withdrawing at the bottom of the fractionating column pure crotonic acid and, at the top, water together with the small amount of formic and acetic acids which have been formed during the distillation.

When the oxidation of crotonaldehyde is carried out according to the process of my invention, little, if any, higher-boiling resinifiable impurities are produced so that the subsequent steam distillation can be carried out with a minimum amount of steam.

The following example illustrates one manner of carrying the invention into effect:

*Example*—Into an aluminium vessel containing 4000 parts by weight of a reaction mixture consisting of crotonaldehyde and its oxidation products, crotonaldehyde and oxygen are fed at a constant rate whilst through an overflow a corresponding amount of reaction liquid is continuously withdrawn. By external cooling, the temperature in the oxidiser is maintained at 29° C. The rate at which oxygen is passed into the reaction mixture is so regulated that the effluent gas contains about 10% by volume of oxygen. The oxidation vessel is fitted with a high speed stirrer and the oxygen inlet is placed at the bottom end of the oxidiser.

At a concentration of 50% by weight of crotonaldehyde in the reaction mixture, 83% by weight of the crotonaldehyde which was passed in was converted into crotonic acid—the amount of higher-boiling products being not more than 4% by weight. When using air instead of oxygen and maintaining a crotonaldehyde concentration of 27% by weight in the reaction mixture only 48% by weight of the reacted crotonaldehyde was converted into crotonic acid, the main product being higher-boiling substances.

What I claim is:

1. A continuous process for the manufacture of crotonic acid by the oxidation of crotonaldehyde by means of molecular oxygen characterised in that the concentration of crotonaldehyde in the liquid reaction mixture consisting of crotonaldehyde and its oxidation products is maintained above 50% by weight thereof and an oxygen-containing gas containing a proportion of oxygen greater than that of air is continuously introduced into said reaction mixture in intimate admixture therewith.

2. A continuous process for the manufacture of crotonic acid which comprises continuously feeding crotonaldehyde to a liquid reaction mixture consisting of crotonaldehyde and its oxidation products at a rate sufficient to maintain the crotonaldehyde content thereof above 50% by weight, continuously feeding oxygen to said reaction mixture in intimate contact therewith and continuously withdrawing a portion of the reaction mixture for the recovery of crotonic acid therefrom.

3. A continuous process for the manufacture of crotonic acid which comprises continuously feeding crotonaldehyde to a liquid reaction mixture consisting of crotonaldehyde and its oxidation products at a rate sufficient to maintain the crotonaldehyde content thereof above 50% by weight, maintaining the temperature of the reaction mixture between 25° and 35° C., continuously feeding excess oxygen to said reaction mixture in intimate contact therewith and continuously withdrawing a portion of the reaction mixture for the recovery of crotonic acid therefrom.

4. A continuous process for the manufacture of crotonic acid which comprises continuously feeding crotonaldehyde to a liquid reaction mixture consisting of crotonaldehyde and its oxidation products at a rate sufficient to maintain the crotonaldehyde content thereof above 50% by weight, maintaining the temperature of the reaction mixture between 25° and 35° C., continuously feeding oxygen to said reaction mixture in intimate contact therewith by continuously withdrawing a portion of the reaction mixture removing unchanged crotonaldehyde from the withdrawn portion, treating the withdrawn portion by steam distillation and fractionally condensing the distillate to recover crotonic acid therefrom.

5. A continuous process for the manufacture of crotonic acid which comprises continuously feeding crotonaldehyde to a liquid reaction mixture consisting of crotonaldehyde and its oxidation products at a rate sufficient to maintain the crotonaldehyde content thereof above 50% by weight, maintaining the temperature of the reaction mixture between 25° and 35° C., continuously feeding oxygen to said reaction mixture in intimate contact therewith at a rate such that the effluent gases contain about 10% by volume of oxygen and continuously withdrawing a portion of the reaction mixture for the recovery of crotonic acid therefrom.

KARL HEINRICH WALTER TUERCK.

REFERENCES CITED

The following references are of record in the file of this patent:

UNITED STATES PATENTS

| Number | Name | Date |
|---|---|---|
| 1,911,219 | Bauer et al. | May 30, 1933 |
| 1,445,544 | Odinga | Feb. 13, 1923 |
| 2,009,838 | Foster | July 30, 1935 |
| 2,183,325 | Standinger | Dec. 12, 1939 |
| 2,212,900 | Groll et al. | Aug. 27, 1940 |
| 2,254,725 | Bardwell | Sept. 2, 1941 |
| 2,341,339 | Staudinger et al. | Feb. 8, 1944 |

FOREIGN PATENTS

| Number | Country | Date |
|---|---|---|
| 369,636 | Germany | Feb. 22, 1923 |

OTHER REFERENCES

Duchesne et al., Bull. Soc. Chim de France, vol. 35, pp. 1311–1317 (1924).

Owen, Jour. Chem. Soc. (London), 1943, pp. 463–467.